US012295287B2

(12) United States Patent
Minnich et al.

(10) Patent No.: US 12,295,287 B2
(45) Date of Patent: May 13, 2025

(54) GRAIN TANK REINFORCEMENT FOR AGRICULTURAL VEHICLE

(71) Applicant: CNH Industrial America LLC, New Holland, PA (US)

(72) Inventors: Michael Minnich, Elizabethtown, PA (US); Alexander Dunn, Prairie Village, KS (US); Karl Linde, Leola, PA (US); Andrew Saienni, West Grove, PA (US)

(73) Assignee: CNH Industrial America LLC, New Holland, PA (US)

( * ) Notice: Subject to any disclaimer, the term of this patent is extended or adjusted under 35 U.S.C. 154(b) by 125 days.

(21) Appl. No.: 18/077,378

(22) Filed: Dec. 8, 2022

(65) Prior Publication Data

US 2024/0188492 A1 Jun. 13, 2024

(51) Int. Cl.
*A01D 41/12* (2006.01)
*B60P 1/42* (2006.01)
*B60P 3/22* (2006.01)

(52) U.S. Cl.
CPC ............ *A01D 41/1208* (2013.01); *B60P 1/42* (2013.01); *B60P 3/2215* (2013.01)

(58) Field of Classification Search
USPC .................................................... 411/77, 160
See application file for complete search history.

(56) References Cited

U.S. PATENT DOCUMENTS

| | | | |
|---|---|---|---|
| 2,541,984 A * | 2/1951 | Chandler | B65G 65/46 56/473.5 |
| 3,190,423 A | 6/1965 | Wenning | |
| 3,251,501 A * | 5/1966 | Mesnager | B60P 3/222 220/560.05 |
| 3,326,605 A * | 6/1967 | Steingas | B60P 1/30 298/23 D |
| 4,106,649 A * | 8/1978 | Nelson | B60P 1/42 53/493 |
| 4,575,294 A * | 3/1986 | Mermi | B23B 51/0045 175/289 |

(Continued)

FOREIGN PATENT DOCUMENTS

| | | |
|---|---|---|
| CN | 203951880 U | 11/2014 |
| DE | 2329239 A1 | 1/1975 |
| WO | 2019186380 A1 | 10/2019 |

*Primary Examiner* — Joseph A Dillon, Jr.
(74) *Attorney, Agent, or Firm* — Peter K. Zacharias; Rickard K. DeMille; Rebecca L. Henkel

(57) ABSTRACT

A system for fastening a tension rod of a grain tank of an agricultural vehicle to a frame of the agricultural vehicle to which the grain tank is mounted. The tension rod includes an elongated body extending between a first connection end that is configured to be connected either directly or indirectly to the grain tank, and a second connection end including openings for respectively receiving fasteners. A first member is either configured to be mounted to the frame or associated with the frame. The first member includes (i) openings for respectively receiving the fasteners, and (ii) a first non-planar mounting surface. A second member includes (i) openings for respectively receiving the fasteners and (ii) a second non-planar mounting surface that is configured to be directly engaged with the first non-planar mounting surface to limit relative motion between the tension rod and the frame in an assembled state.

11 Claims, 5 Drawing Sheets

(56) References Cited

U.S. PATENT DOCUMENTS

| | | | | |
|---|---|---|---|---|
| 4,923,358 | A * | 5/1990 | Van Mill | B60P 1/42 |
| | | | | 414/520 |
| 5,344,252 | A * | 9/1994 | Kakimoto | F16D 1/0888 |
| | | | | 411/63 |
| 5,409,344 | A * | 4/1995 | Tharaldson | B60P 1/42 |
| | | | | D15/27 |
| 5,529,424 | A * | 6/1996 | Neubert | F16B 13/0816 |
| | | | | 403/409.1 |
| 6,918,238 | B2 * | 7/2005 | Cooksey | A01D 61/00 |
| | | | | 198/780 |
| 7,168,902 | B2 * | 1/2007 | Terry | F16B 39/24 |
| | | | | 411/149 |
| 7,857,565 | B2 * | 12/2010 | Martinson | F16B 5/0225 |
| | | | | 411/533 |
| 8,113,565 | B2 * | 2/2012 | Zeuner | A01D 41/1226 |
| | | | | 296/100.1 |
| 9,545,053 | B2 * | 1/2017 | Fay, II | A01D 34/733 |
| 9,961,835 | B2 * | 5/2018 | Lauwers | A01D 57/00 |
| 10,135,111 | B2 * | 11/2018 | Albano | H01Q 1/3275 |
| 10,590,985 | B1 * | 3/2020 | Lagred | F16C 13/022 |
| 11,104,258 | B2 * | 8/2021 | Grieshop | B60P 1/42 |
| 11,491,905 | B2 * | 11/2022 | Kibler | B60P 3/24 |
| 2009/0311068 | A1 * | 12/2009 | Rudduck | F16B 7/0473 |
| | | | | 411/909 |
| 2015/0156968 | A1 | 6/2015 | Lauwers et al. | |
| 2015/0305235 | A1 * | 10/2015 | Fay, II | A01D 34/733 |
| | | | | 56/295 |
| 2016/0108943 | A1 * | 4/2016 | Knutson | F16B 5/0225 |
| | | | | 403/108 |
| 2023/0068050 | A1 * | 3/2023 | Sietsema | A01B 59/002 |
| 2024/0196788 | A1 * | 6/2024 | Minnich | A01D 41/1217 |

\* cited by examiner

GRAIN TANK REINFORCEMENT FOR AGRICULTURAL VEHICLE

FIELD OF THE INVENTION

The present invention relates to agricultural vehicles, such as combine harvesters. More specifically, the present invention relates to an apparatus for reinforcing the grain tank and unload tube of an agricultural vehicle.

BACKGROUND OF THE INVENTION

As is described in U.S. Patent App. Pub. No. 2015/0156968 to CNH America LLC (the '968 Pub.), which is incorporated by reference in its entirety and for all purposes, a combine harvester is a type of agricultural vehicle that is used to harvest grain crops.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the material other than grain ("MOG") through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material (i.e., MOG) are returned to the field via a spreader mechanism.

The threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located in an upper portion of the combine and loaded via a conveyer that carries clean grain collected in the cleaning system to the grain tank.

Conventional unload systems include grain tanks arranged such that grain conveyed from the cleaning system fills the tanks and is gravity-fed into one or more cross augers. By virtue of gravity feed and the cross augers, grain may be distributed to one or more areas in the grain tank, such that another conveying system can unload the grain from the grain tank. Because the typical grain tank is small compared to the size of the harvest, grain that collects temporarily in the grain tank may, in some harvests, be conveyed or unloaded via an unload tube to a support trailer, truck, or grain cart alongside the combine.

The unload tube, which has considerable length and weight, is pivotably mounted to the grain tank. Described herein is a system for reinforcing the unload tube, grain tank and/or the vehicle in an effort to support the considerable weight of the unload tube.

SUMMARY OF THE INVENTION

According to one aspect of the invention, a system is provided for fastening a tension rod of a grain tank of an agricultural vehicle to a frame of the agricultural vehicle to which the grain tank is mounted. The tension rod includes an elongated body extending between a first connection end that is configured to be connected either directly or indirectly to the grain tank, and a second connection end including openings for respectively receiving fasteners. A first member is either configured to be mounted to the frame or associated with the frame. The first member includes (i) openings for respectively receiving the fasteners, and (ii) a first non-planar mounting surface. A second member includes (i) openings for respectively receiving the fasteners and (ii) a second non-planar mounting surface that is configured to be directly engaged with the first non-planar mounting surface to limit relative motion between the tension rod and the frame in an assembled state.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
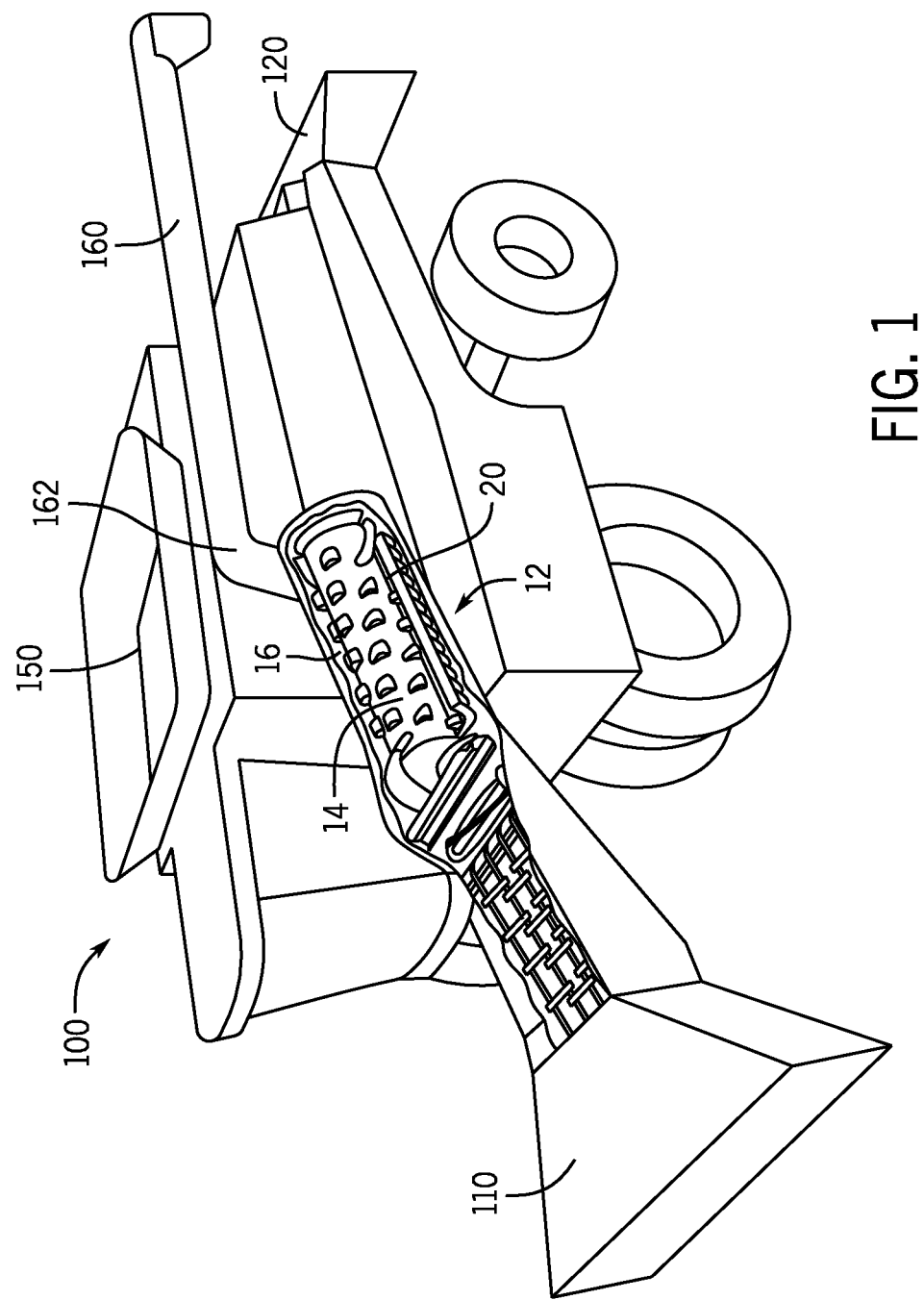
FIG. 1 illustrates a perspective view of an exemplary combine for use with embodiments described herein.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

Figure 2:
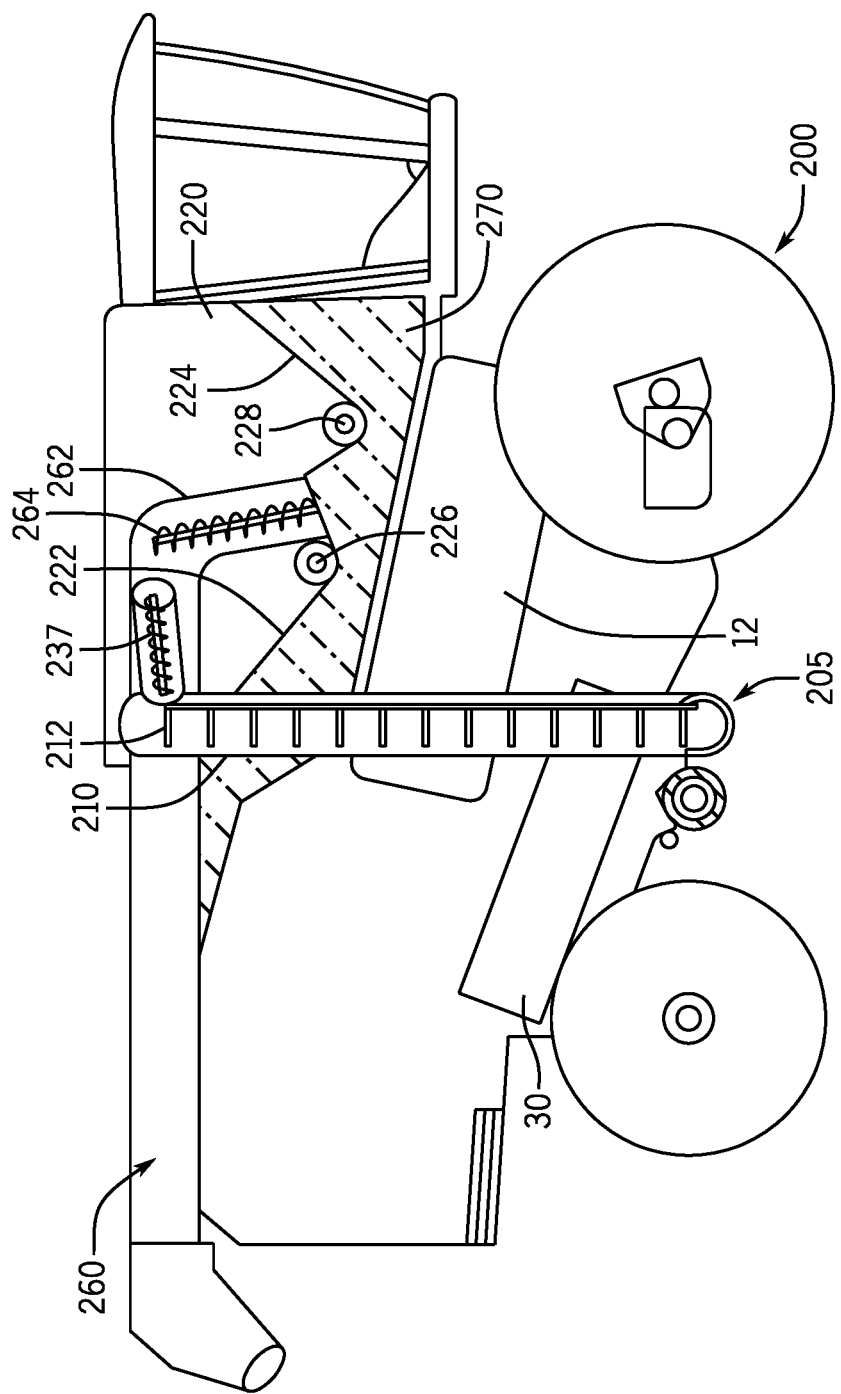
FIG. 2 illustrates a side view of an exemplary combine for use with embodiments described herein.

As is described in the '968 Pub., FIGS. 1 and 2 show exemplary agricultural combines in which exemplary embodiments described herein may be implemented. FIG. 1 shows an exemplary agricultural combine 100, which may also be referred as a combine or harvester throughout this specification. As shown in FIG. 1, the combine 100 can include header 110, a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concave 20 may extend circumferentially around the rotor 14 and the flow of crop may pass in the space between the spinning rotor and the concaves. As the crop material flows through the threshing and separation system 12, the crop material will be loosened and separated from crop residue or MOG, and the separated materials may be carried away from the threshing and separation system 12 in a well-known conventional manner. Crop residue can be redistributed to the field via a spreader 120, located at, for example, the back of the harvester.

The remaining threshed crop, which includes the grain to be collected, is then cleaned via a cleaning system. The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160 representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 are replaced by an unload conveying auger that is attached to the one or more cross augers conveying grain from the cleaning system and may pivot from side to side from the combine 100, conveying grain from the combine 100.

FIG. 2 shows a transparent cross-sectional view of an exemplary agricultural combine 200 including a grain tank 220 with multiple cross augers 226 and 228 which may be used with embodiments described herein. Crop is threshed via threshing system 12. The 20) threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210 which includes a paddle chain lift 212. The paddle chain lift 212 conveys the grain upward to a dispenser auger 237 that discharges the grain into the grain tank 220. In other arrangements, the grain is lifted from the paddle chain lift 212 and then flipped at the top of the elevator to a sump (not shown), containing a bubble-up auger (not shown). The bubble-up auger transports grain from the sides of the grain tank 220 to the top center of the tank where the grain is discharged in the center of the tank 220 to naturally form a cone-shape pile. In this arrangement of grain tank 220, sloping side walls 222 and 224 are sloped such that as grain accumulates in the grain tank 220 as conveyed from dispenser auger 237, the grain naturally slides down to cross augers 226 and 228. Grain tank cross augers 226 and 228 convey the accumulated grain laterally so that it may be collected into vertical tube 262 which includes an unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

As noted above, the unload tubes 160 and 260, which are mounted either directly or indirectly to the grain tanks 150 and 220, respectively, have considerable length and weight and are pivotably mounted to the grain tank. Each unload tube pivots between a stored position (adjacent the grain tank) and a deployed position in which the unload tube is pivoted away from the grain tank to transfer clean grain to a support trailer, truck, or grain cart that is positioned alongside the combine. Described hereinafter is a system for reinforcing the unload tube, grain tank and/or the vehicle in an effort to support the considerable weight of the unload tube.

Figure 3:
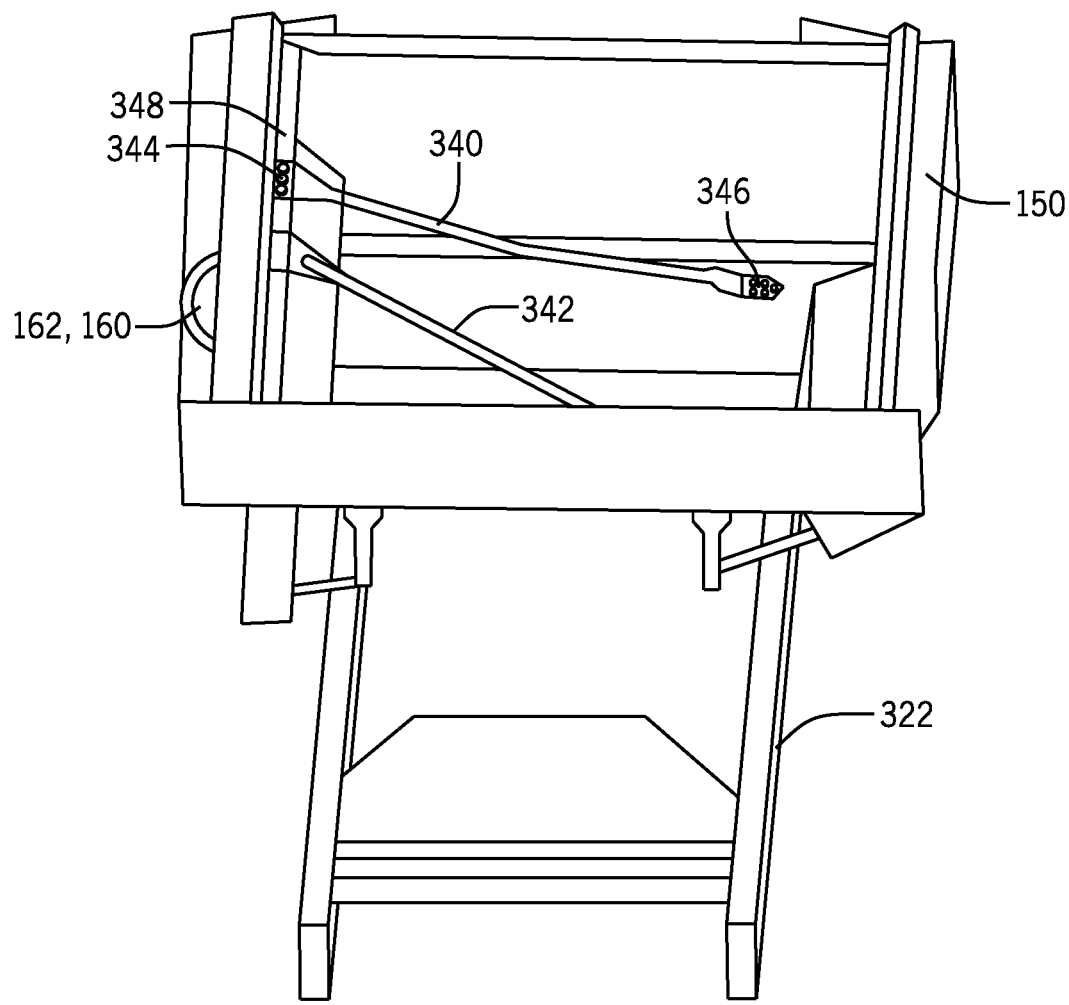
FIG. 3 is an isometric view, as viewed from the top, of a sub-assembly of the combine of FIG. 1, wherein the sub-assembly includes a grain tank, a combine frame and a fastening system.
Figure 4:
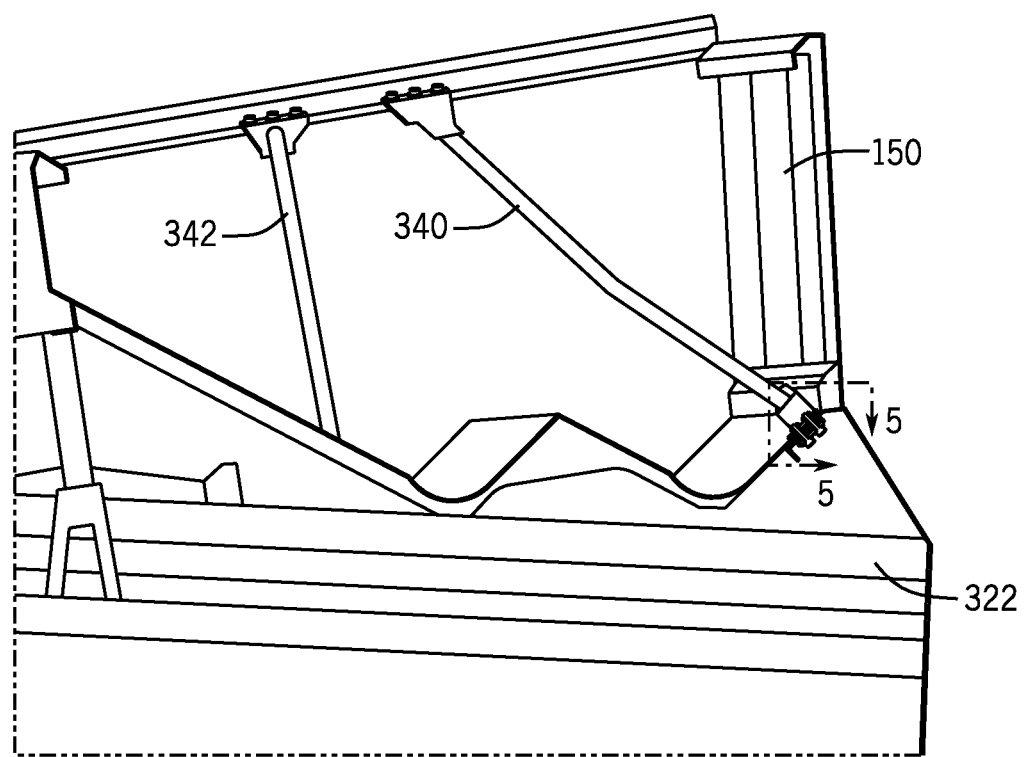
FIG. 4 is a cross-sectional view through the center of the sub-assembly of FIG. 3.

FIGS. 3 and 4 depict an isometric view of a sub-assembly of combine 100. The sub-assembly includes grain tank 150, which is mounted to a structural frame 322 of combine 100. The vertical portion 162 (or other portion) of unload tube 160 is shown in FIG. 3. Two tension rods 340 and 342 are provided for reinforcing and enhancing the structural integrity of tank 150 and unload tube 160 mounted to tank 150. Rod 340 is referred to herein as a front tension rod because it extends toward the front of the vehicle, whereas rod 342 may be referred to herein as a rear tension rod because it extends toward 20) the rear of the vehicle. The reinforcement purpose of rod 340 will be described hereinafter, however, it should be understood that rod 342 may include a similar reinforcement system.

Rod 340 has an elongated body that extends between two connection ends 344 and 346. End 344 is mounted to a frame member 348 of grain tank 150 by three fasteners (for example). Although not explicitly shown, end 344 may also be mounted (either directly or indirectly) to unload tube 160 such that the end 344 supports at least a portion of the weight of unload tube 160. End 346 of rod 340 is mounted to a wall of tank 150 that is associated with an auger trough. End 346 is mounted to frame 322 by a fastening system including bolts and serrated washers that together work to prevent inadvertent movement (i.e., slip) of those bolts. Rod end 346 includes a series of holes or openings (five shown) for mounting rod end 346 using the fastening system. One of those five holes may be provided for a different purpose, if so desired.

Figure 5:
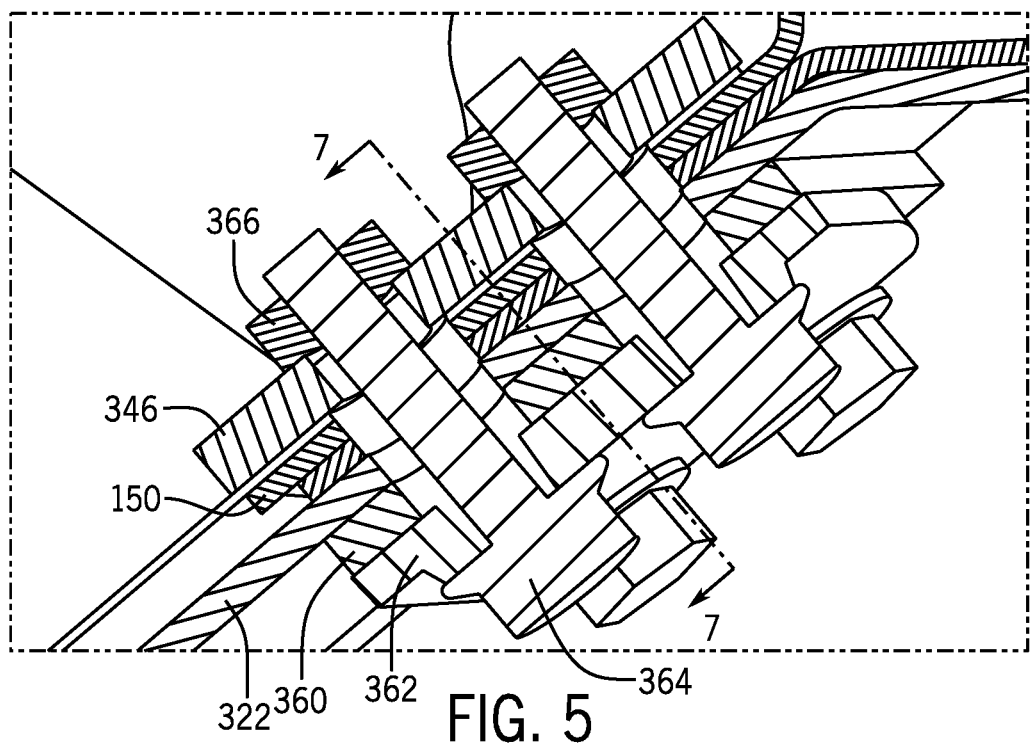
FIG. 5 is a detailed view of FIG. 4 showing the fastening system for mounting a tension rod to the combine frame.
Figure 6:
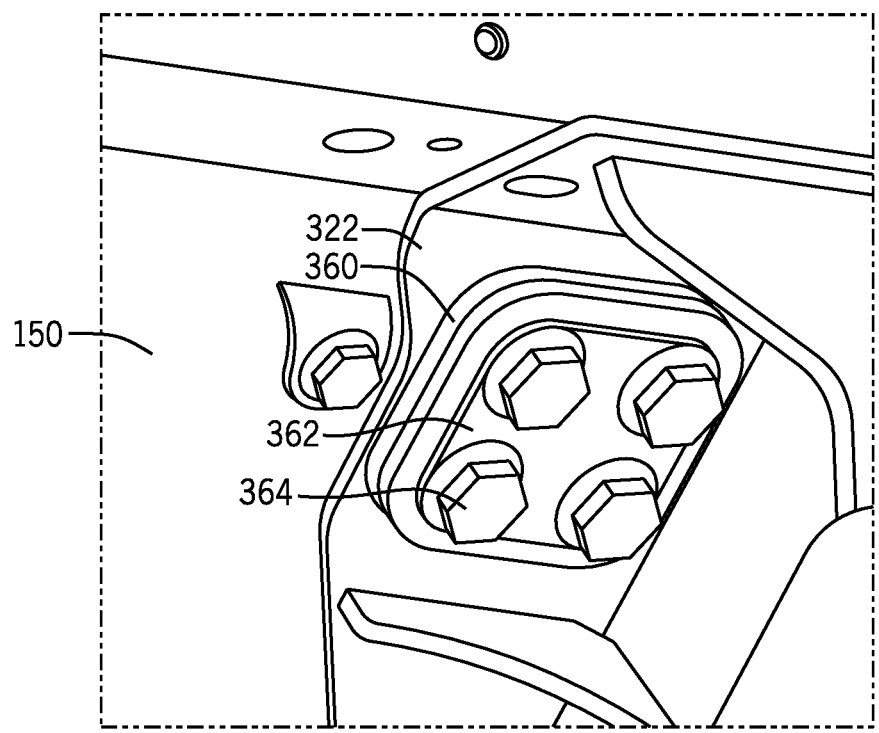
FIG. 6 is a detailed isometric view of the system of FIG. 5 showing the fastening system on the bottom end of the grain tank.
Figure 7:
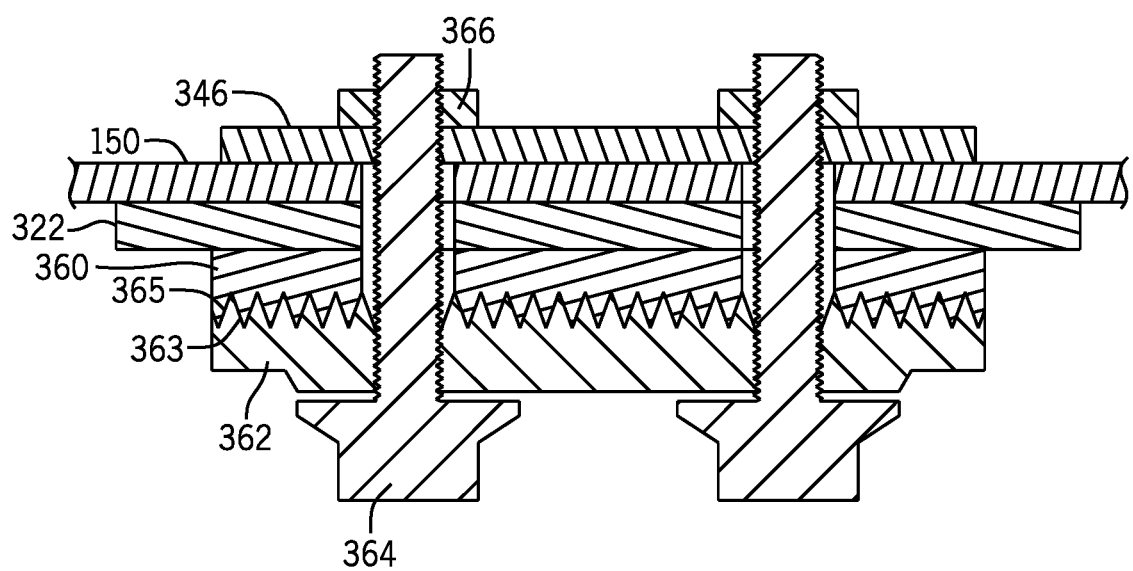
FIG. 7 is a schematic cross-sectional view of the fastening system taken along the lines 7-7 in FIG. 5.

Turning now to FIGS. 5-7, the fastening system for fixing rod end 346 to frame 322 includes (a) a serrated block 360 [also referred to herein as a first member] that is fixedly connected to the frame 322; (b) a serrated washer 362 [also referred to herein as a second member] having serrations 363 that mate with serrations 365 on block 360; (c) fasteners 364 in the form of bolts passing through holes formed in block 360, frame 322, washer 362, tank wall 150 and rod end 346; and (d) nuts 366 that are mounted to the ends of fasteners 364. It should be understood that fastening means other than bolts 364 and nuts 366 may be employed to fix rod end 346 to frame 322. The fastening means may comprise screws, nuts, bolts, pins, clips, clamps, anchors, rivets, and so forth.

Serrated block 360 is a rectangular component (shape may vary) having a series of four holes (for example) for accommodating bolts 364. Block 360 is fixedly connected to the underside of combine frame 322 by welds, adhesive, clips or bolts, for example, such that block 360 cannot move with respect to frame 322. Alternatively, block 360 may be integrated with frame 322. The serrations 365 of block 360 are positioned on the side of block 360 that faces washer 362.

The serrated washer 362 is a rectangular component having a series of four holes for accommodating bolts 364, however, the number of holes may vary. Washer 362 includes serrations on its surface that faces the block 360. The serrations 362 mate with the serrations on block 360 to prevent movement of the washer 362 with respect to block 360, and vice versa. Stated differently, engagement between the serrations 363 and 365 significantly limit shifting and movement between rod end 346 and frame 322 in an assembled state of combine. Washer 362 may be a unitary and removable component of the system.

The serrations of block 360 and washer 360 may have a V-shape (for example) or a saw-tooth right-triangle shape as viewed in cross-section, as best shown in FIG. 7. The serrated surfaces of block 360 and washer 360 may be generally referred to herein as non-planar mounting surfaces. The serrated surfaces may also be described as undulating, uneven or non-planar. The serrations can vary, and be provided in the form of projections, pins, pegs, or undulations. The ends of the serrations may be either sharp and pointed, or rounded. Although not as effective, the serrations could be replaced by a friction surface (e.g., a high friction surface coating, rough machining process, and so forth) without departing from the scope or spirit of the invention.

The components of the fastening system are stacked and sandwiched together in the following order (as viewed starting from the inside of tank 150): nut 366, rod end 346, tank wall 150, combine frame 322, block 360, washer 362 and bolt head 364.

The holes in block 360, frame 322, and the wall of tank 150 though which bolts 364 respectively pass are oversized in relation to the diameter of the shaft of bolt 364 to accommodate tolerance stacks and ensure that the bolts 364 can pass through the respective holes in rod end 346. Stated differently, the holes in block 360, frame 322, and the wall of tank 150 have a larger diameter (or, more generally, larger opening area if not circular) than the corresponding holes in washer 362 and rod end 346. The holes in washer 362 may be frusto-conical as shown, with the small diameter end positioned closest to the fastener heads 364.

Serrated block 360 may also be referred to herein as a serrated washer. Together, block 360 and washer 362 may be referred to as a mated pair of serrated washers.

The above described components of the fastening system may be composed of a high-strength metallic material, for example, or any other high-strength material known to those skilled in the art.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for fastening a tension rod of a grain tank of an agricultural vehicle to a frame of the agricultural vehicle to which the grain tank is mounted, said system comprising:
   the tension rod having an elongated body extending between a first connection end that is configured to be connected either directly or indirectly to the grain tank, and a second connection end including openings for respectively receiving fasteners;
   a first member that is configured to be mounted to the frame, said first member including (i) openings for respectively receiving the fasteners and (ii) a first non-planar mounting surface;
   a second member including (i) openings for respectively receiving the fasteners and (ii) a second non-planar mounting surface that is configured to be directly engaged with the first non-planar mounting surface to limit relative motion between the tension rod and the frame in an assembled state;
   the fasteners, wherein each fastener is configured to mount together the first member, the second member, the frame, the second connection end of the tension rod, and the grain tank, wherein each fastener is a threaded bolt; and
   nuts for respectively connecting to the threaded bolts, wherein the nut is positioned against the second connection end of the tension.

2. The system of claim 1, wherein the first and second non-planar mounting surfaces each comprise complimentary serrations, undulations, projections or teeth.

3. The system of claim 1, wherein the first and second non-planar mounting surfaces each comprise complimentary serrations.

4. A system for fastening a tension rod of a grain tank of an agricultural vehicle to a frame of the agricultural vehicle to which the grain tank is mounted, said system comprising:
   the tension rod having an elongated body extending between a first connection end that is configured to be connected either directly or indirectly to the grain tank, and a second connection end including openings for respectively receiving fasteners;
   a first member that is configured to be mounted to the frame, said first member including (i) openings for respectively receiving the fasteners and (ii) a first non-planar mounting surface; and
   a second member including (i) openings for respectively receiving the fasteners and (ii) a second non-planar mounting surface that is configured to be directly engaged with the first non-planar mounting surface to limit relative motion between the tension rod and the frame in an assembled state, wherein either (i) the openings of the first member are larger than the openings of the second connection end of the tension rod or (ii) the openings of the first member are larger than the openings of the second member.

5. The system of claim 1, wherein the second member is sandwiched between heads of the fasteners and the first member.

6. The system of claim 1, wherein the openings of the first member are larger than the openings of the second member.

7. The system of claim 1, wherein the first end is configured to be either directly or indirectly connected to an unload tube of the agricultural vehicle.

8. An agricultural vehicle comprising the system of claim 7.

9. The agricultural vehicle of claim 8, wherein the first member is either fixedly connected to, or integrated with, the frame.

10. A grain tank including the system of claim 1, wherein the tension rod is positioned at least partially within an interior region of the grain tank.

11. A combine harvester comprising:
a vehicle frame;
a grain tank mounted to and supported by the vehicle frame;
a tension rod positioned at least partially within an interior region of the grain tank and mounted to both the vehicle frame and the grain tank, the tension rod having an elongated body extending between a first connection end that is connected either directly or indirectly to the grain tank, and a second connection end including openings for respectively receiving fasteners;
a first member that is mounted to the frame, said first member including (i) openings for respectively receiving the fasteners and (ii) a first non-planar mounting surface;
a second member including (i) openings for respectively receiving the fasteners and (ii) a second non-planar mounting surface that is directly engaged with the first non-planar mounting surface to limit relative motion between the tension rod and the frame in an assembled state; and
the fasteners, wherein each fastener mounts together the first member, the second member, the frame, the second connection end of the tension rod, and the grain tank.

* * * * *